April 26, 1938.  J. L. McFARLAND  2,115,586
CALCINING APPARATUS
Filed Aug. 30, 1934
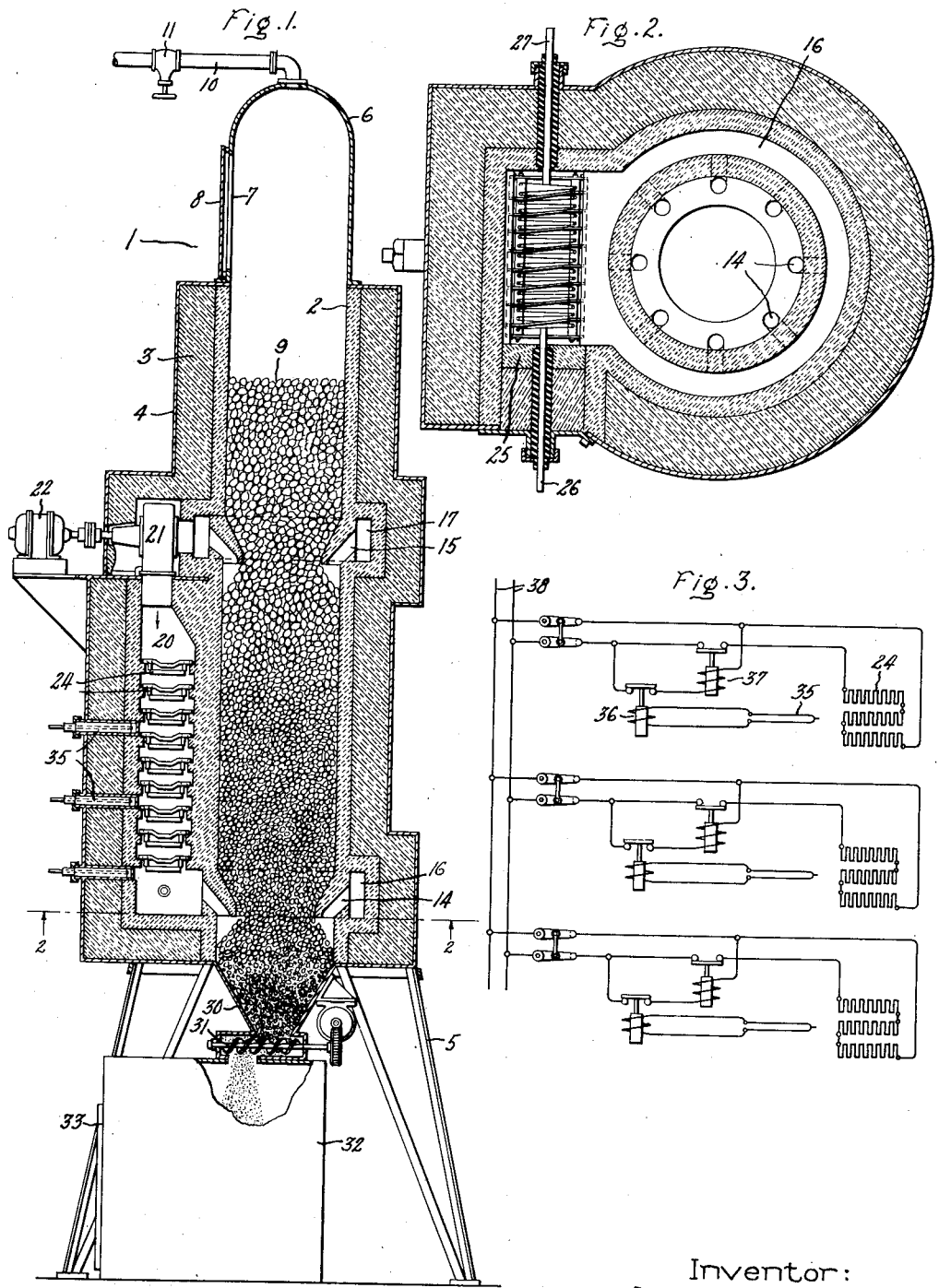
Inventor:
James L. McFarland,
by Harry E. Dunham
His Attorney.

Patented Apr. 26, 1938

2,115,586

UNITED STATES PATENT OFFICE 2,115,586

CALCINING APPARATUS

James L. McFarland, Schenectady, N. Y., assignor to General Electric Company, a corporation of New York Application August 30, 1934, Serial No. 742,130

6 Claims. (Cl. 13—20)

My invention relates to calcining apparatus by means of which a carbonate by being subjected to heat is reduced to a friable state and the volatile matter combined therewith is liberated. While my invention is not limited to the treatment of any particular carbonate it is especially useful in the treatment of calcium carbonate in the manufacture of lime and carbon dioxide.

One object of my invention is to provide improved apparatus for heating a carbonate whereby the products of the process may be obtained in a relatively pure state. Another object of my invention is the provision of such apparatus by which a recovery of heat not used in the chemical change of the carbonate is effected and the heat loss in the apparatus is reduced to a minimum. A further object is the provision of means whereby the medium by which the heat is transferred to the carbonate is moved in intimate relation with all parts thereof.

In accordance with my invention I provide a closed receptacle or vessel to receive the carbonate which vessel has means at the upper portion thereof by which it may be charged with the carbonate, and means at the bottom thereof by which the friable residue may be removed. It is also provided with suitable means by which the liberated gas may be withdrawn therefrom. The vessel is provided with spaced openings connected by a heating passage, and a part of the gas liberated in the vessel is caused to circulate in a closed path including this passage and the vessel. Suitable means are provided for heating the gas as it moves through the passage whereby the temperature of the gas entering the vessel is raised sufficiently high to heat the carbonate to the calcining temperature. By this apparatus the heat is applied to the gas outside of the chamber containing the carbonate and the hot gas is then forced to pass in intimate relation with the carbonate to insure the rapid transfer of heat thereto.

My invention will be better understood from the following description taken in connection with the accompanying drawing, and its scope will be pointed out in the appended claims.

Referring to the drawing, Fig. 1 is a vertical sectional view illustrating an embodiment of my invention, Fig. 2 is a transverse sectional view taken on the line 2—2 of Fig. 1, and Fig. 3 is a circuit diagram of the heating units and the control apparatus therefor.

The closed vessel I which stands upright and is represented in the drawing as being of cylindrical form, has the inner wall 2 composed of heat refractory material which is surrounded by the layer 3 of heat insulating material. The whole is shown enclosed by the metal casing 4 which preferably is mounted in an elevated position by means of the framework 5. The top of the vessel is covered with a dome-like structure 6 having at one side thereof the opening 7 closed by the door 8 whereby the vessel may be charged at intervals with the carbonate represented at 9. The dome 6 also has connected with it the outlet pipe 10 having the valve 11 by which the flow of the gas liberated by the calcination may be controlled. Under certain circumstances, it may be found desirable to employ a pump by which to withdraw the gas from the vessel.

As mentioned above, heat is applied to the carbonate in the vessel by withdrawing a part of the gas from one portion of the vessel, passing it through a heating passage, and forcing it into the vessel at another point thereof. To provide for this circulation of heated gas the refractory wall 2 of the vessel is shown provided with a series of openings 14 adjacent the bottom of the vessel and with a second similar series of openings 15 at a higher, intermediate point. Preferably, these openings open downwardly as shown whereby they are not liable to become choked with the material in the vessel. The openings 14 and 15 connect with the passages 16 and 17 respectively which in the present illustration are shown as annular passages formed in the refractory wall 2. At one side of the vessel the wall 2 is shown extended to form the heating passage 20 which at opposite ends connects with the passages 16 and 17. The gas is caused to circulate in the closed circuit comprising the vessel, the openings 14 and 15, the passages 16 and 17, and the heating passage 20 by means of a suitable blower shown at 21 which may be inserted in any point of this closed path but preferably is arranged as shown between the upper passage 17 and the heating passage 20. Any suitable means may be provided for operating the blower 21, such for example, as the electric motor 22 shown direct connected with the blower and arranged outside of the casing 4. By means of the blower 21 the gas is withdrawn from the intermediate portion of the vessel through the openings 15 and passage 17, forced downwardly through the heating passage 20 and caused to reenter the lower part of the vessel through the passage 16 and the openings 14.

Heat may be applied to the gas in the heating passage 20 in any desired manner. I prefer to heat the gas electrically and for this purpose I have shown the passage 20 provided with a series of electric heating units 24 which are arranged transversely of the passage so that the gas passes through and in intimate contact with each unit. To facilitate inspection and replacement of the units 24, one wall of the heating passage is shown provided with a removable portion 25 through which extends one of the current supply conductors 26, the other conductor 27 passing through the opposite wall of the passage. These units supply all the heat necessary for the chemical reaction of the calcination process as well as for making up for radiation losses and the heat carried away in the gas and the friable residue taken from the apparatus. The temperature required for the proper calcination of the carbonate and to prevent a recombination of the products of the process is in general relatively high but depends upon the particular carbonate being calcined. For example, in the production of carbon dioxide and lime from calcium carbonate, the temperature of the carbon dioxide entering the bottom of the calcining vessel should be approximately 1850° F. The carbon dioxide withdrawn from the intermediate part of the vessel by the blower may have a temperature of approximately 1200° F., heat to make up this difference in temperature being supplied by the heating units 24. It is because of this difference in temperature that I prefer to arrange the blower above the heater where the gas which it encounters is at the lower temperature.

At the bottom of the casing 4, I have shown a hopper 30 which receives the residue, such for example, as lime where calcium carbonate is the material being calcined. Any suitable feeding means may be provided, such for example as the motor driven screw 31, for regulating the rate of discharge of the residue from the hopper. I have shown the screw 31 arranged to discharge the material from the hopper into the enclosed receptacle 32 having the door 33 at one side thereof through which the material collected by the receptacle may be removed at intervals.

For regulating the temperature of the gas heated in the passage 20, I have shown several thermocouples 35 embedded in the wall of the heating passage and connected with the relays 36. The latter control the operation of the contactors 37 to close or open the circuit of each group of heating units 24. The several groups of heating units have similar control apparatus and all are supplied from the same source of current 38. The control apparatus may, if desired, be like that disclosed in Patent No. 1,658,682 to Carl L. Ipsen dated February 7, 1928.

From the above description it will be seen that I have provided a calcining apparatus or kiln which is particularly well adapted for the economical manufacture of products such as carbon dioxide and lime in large quantities and in a relatively pure state. It is, of course, true that during each recharging of the apparatus with carbonate a large amount of air will be admitted but this air will pass out ahead of the carbon dioxide and may be allowed to escape to the atmosphere.

In this apparatus, the carbonate is raised to the high temperature required for its calcination by forcing the highly heated gas through the mass thereof and in intimate contact with the separate particles comprising it. Moreover, the gas is heated by being passed directly through the heaters arranged in a heat insulated passage. Since the apparatus when in operation is closed to the atmosphere the heat retained by the gas after being forced through the carbonate is not lost but is recovered by passing the gas through the heaters for reheating. Obviously, the gas which is being withdrawn for use from the top of the apparatus gives up a part of its heat to the carbonate through which it passes, and so serves to preheat it.

I have chosen the particular embodiment described above as illustrative of my invention and it will be apparent that various modifications thereof may be made without departing from the spirit and scope of my invention, which modifications I aim to cover by the appended claims.

What I claim as new and desire to secure by Letters Patent of the United States is:

1. Calcining apparatus comprising a closed upright vessel having a heat insulated refractory wall forming a calcining chamber, said wall being constructed to provide a gas heating passage therein and having openings connecting the opposite ends of said passage with the interior of said vessel, a blower for circulating the gas through said chamber and passage and heating units in said passage.

2. Calcining apparatus comprising a closed upright vessel having a circular heat insulated refractory wall providing a plurality of spaced annular gas passages, a plurality of openings connecting each of said passages with the interior of said vessel, a heating passage formed in said wall and connected at opposite ends with said passages, a plurality of heating units in said heating passage and a blower arranged between said heating passage and one of said annular passages.

3. Calcining apparatus comprising a closed upright vessel including a metallic outer casing, a refractory lining and an intermediate layer of heat insulation, a heating passage formed in said lining, heating means therein, passages connecting the upper and lower ends of said heating passage respectively with the intermediate and the lower portion of said vessel, a blower arranged in one of said connecting passages and enclosed by said casing and heat insulation, a driving motor for the blower arranged externally of the casing, a closed receptacle connecting with the bottom of said vessel and means for feeding the friable residue from said vessel to the receptacle.

4. Calcining apparatus comprising a vessel having a refractory wall forming an elongated calcining chamber, said wall having a gas heating passage formed therein and extending longitudinally of the chamber, an electric heating device in said passage, connecting passages between the ends of said heating passage and the corresponding ends of said chamber and means for circulating the gas through said passages and chamber.

5. Calcining apparatus comprising an outer casing and a heat refractory wall therein forming an elongated calcining chamber, said wall having a heating passage formed therein, an electric heating device arranged in the passage, connecting passages between opposite ends of said heating passage and the corresponding ends of said chamber, a blower in one of said connecting passages and a motor arranged outside of said casing and connected to operate said blower.

6. Calcining apparatus comprising an upright outer casing, a heat insulating layer therein, a heat refractory wall in said layer forming a calcining chamber, said wall at one side of said chamber being constructed with an opening therein forming a gas heating passage, a plurality of electric heating elements arranged in and extending across said heating passage, gas passages connecting the upper and lower ends of said heating passage respectively with the intermediate and lower portions of said chamber, a blower in the upper connecting passage for withdrawing gas from said intermediate portion of the calcining chamber and a motor arranged exteriorly of said casing connected to operate the blower.

JAMES L. McFARLAND.